United States Patent
Itami

(10) Patent No.: US 8,681,377 B2
(45) Date of Patent: Mar. 25, 2014

(54) IMAGE PROCESSING APPARATUS, IMAGE PROCESSING METHOD, AND PROGRAM FOR EXECUTING PRINTING USING TRANSPARENT RECORDING MATERIAL

(75) Inventor: Tsuyoshi Itami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/208,110

(22) Filed: Aug. 11, 2011

(65) Prior Publication Data
US 2012/0050801 A1  Mar. 1, 2012

(30) Foreign Application Priority Data
Aug. 30, 2010 (JP) ................................ 2010-192399

(51) Int. Cl.
*H04N 1/60* (2006.01)

(52) U.S. Cl.
USPC ............................. 358/1.9; 345/87; 345/212

(58) Field of Classification Search
USPC ................................. 358/1.12, 1.9
See application file for complete search history.

(56) References Cited

U.S. PATENT DOCUMENTS

2004/0239960 A1\* 12/2004 Hoes et al. ............... 358/1.2
2010/0195126 A1\* 8/2010 Shiozawa .................. 358/1.9

FOREIGN PATENT DOCUMENTS

JP 2006-251722 A 9/2006
JP 2008-145784 A 6/2008

\* cited by examiner

*Primary Examiner* — Benny Q Tieu
*Assistant Examiner* — Juan M Guillermety
(74) *Attorney, Agent, or Firm* — Canon USA, Inc., IP Division

(57) ABSTRACT

The present invention provides an image processing apparatus including a specification unit specifying a region where printing is performed by using a transparent recording material in image data-for-outputting, a comparison unit comparing a first reflectivity obtained when printing is performed for the specified region by using the transparent recording material with a second reflectivity obtained when printing is performed for the specified region without using the transparent recording material, a determination unit that determines the use of a first display form when the comparison indicates that the first reflectivity is higher than the second reflectivity and that determines the use of a second display form when the comparison indicates that the first reflectivity is lower than the second reflectivity, and a display unit displaying the specified region by using a display form determined through the determination unit.

25 Claims, 17 Drawing Sheets

FIG. 4

| PAPER TYPE | IRRADIATION ANGLE | ADHESION AMOUNT OF CYAN TONER | ADHESION AMOUNT OF MAGENTA TONER | ADHESION AMOUNT OF YELLOW TONER | ADHESION AMOUNT OF BLACK TONER | ADHESION AMOUNT OF TRANSPARENT TONER | TARGET MODEL'S PARAMETERS (a, b) |
|---|---|---|---|---|---|---|---|
| GLOSSY PAPER | 45° | 10% | 10% | 10% | 10% | 100% | a=1.0  b=1.0 |
| GLOSSY PAPER | 45° | 20% | 20% | 20% | 20% | 100% | a=1.0  b=1.2 |
| GLOSSY PAPER | 45° | 30% | 30% | 30% | 30% | 100% | a=2.0  b=1.4 |
| GLOSSY PAPER | 45° | 40% | 40% | 40% | 40% | 100% | a=2.0  b=1.6 |
| ... | ... | ... | ... | ... | ... | ... | ... |

| PAPER TYPE | IRRADIATION ANGLE | ADHESION AMOUNT OF CYAN TONER | ADHESION AMOUNT OF MAGENTA TONER | ADHESION AMOUNT OF YELLOW TONER | ADHESION AMOUNT OF BLACK TONER | ADHESION AMOUNT OF TRANSPARENT TONER | TARGET MODEL'S PARAMETERS (a, b) |
|---|---|---|---|---|---|---|---|
| GLOSSY PAPER | 45° | 10% | 10% | 10% | 10% | NA | a=0.5  b=0.6 |
| GLOSSY PAPER | 45° | 20% | 20% | 20% | 20% | NA | a=0.5  b=0.8 |
| GLOSSY PAPER | 45° | 30% | 30% | 30% | 30% | NA | a=1.0  b=1.0 |
| GLOSSY PAPER | 45° | 40% | 40% | 40% | 40% | NA | a=1.0  b=1.2 |
| ... | ... | ... | ... | ... | ... | ... | ... |

1701

REFLECTIVITY = f(a, b) = f(1.0, 1.2) = 50(%)   1702 f PROPERTY VARIES DEPENDING ON TARGET MODEL

FIG. 18

| PAPER TYPE | IRRADIATION ANGLE | ADHESION AMOUNT OF CYAN TONER | ADHESION AMOUNT OF MAGENTA TONER | ADHESION AMOUNT OF YELLOW TONER | ADHESION AMOUNT OF BLACK TONER | ADHESION AMOUNT OF TRANSPARENT TONER | TARGET MODEL'S PARAMETERS (a, b) |
|---|---|---|---|---|---|---|---|
| GLOSSY PAPER | 45° | 10% | 10% | 10% | 10% | 100% | a=1.0  b=1.0 |
| GLOSSY PAPER | 45° | 20% | 20% | 20% | 20% | 100% | a=1.0  b=1.2 |
| GLOSSY PAPER | 45° | 30% | 30% | 30% | 30% | 100% | a=2.0  b=1.4 |
| GLOSSY PAPER | 45° | 40% | 40% | 40% | 40% | 100% | a=2.0  b=1.6 |
| ... | ... | ... | ... | ... | ... | ... | ... |

1801

REFLECTIVITY = f(a, b) = f(2.0, 1.6) = 80(%)

1802 f PROPERTY VARIES DEPENDING ON TARGET MODEL

IMAGE PROCESSING APPARATUS, IMAGE PROCESSING METHOD, AND PROGRAM FOR EXECUTING PRINTING USING TRANSPARENT RECORDING MATERIAL

BACKGROUND OF THE INVENTION

1. Field of the Invention

The present invention relates to an image processing apparatus, and particularly relates to an image processing apparatus that can execute printing by using a special-color recording material, and preview image data which is output at the printing-execution time in advance.

2. Description of the Related Art

Usually, image processing apparatuses have been available as systems that capture drawing data transmitted from a host computer and that form image data based on the drawing data. The printing method used for the image processing apparatuses includes, for example, the electrophotography method. In a printing apparatus using the electrophotography method, a charger charges a photosensitive drum, and an electrostatic latent image is formed on the photosensitive drum with the write light corresponding to image data. A developer adheres toner to the electrostatic latent image so that the electrostatic latent image is developed to become a visible image. Next, the toner image is transferred from the photosensitive drum to a sheet, and fixed onto the sheet with heat or pressure.

In the image processing apparatus using the above-described electrophotography method, cyan, magenta, yellow, and black (CMYK) toner, where the term CMYK denotes basic printing colors which are referred to as process colors. Additionally, transparent toner is printed on part of or the entire printed image as a special-color recording material (see Japanese Patent Laid-Open No. 2006-251722, for example).

The special-color recording material includes toner other than the CMYK toner, such as green toner, orange toner, gold toner, silver toner, and the transparent toner.

Especially, the transparent toner is a transparent recording material provided to add a transparent image to a printed output. The use of the transparent toner allows for expressing a special texture including a glossy feeling, a luster feeling, a mat feeling, and so forth, which is different from that attained through printing performed only by using colored toner.

Further, systems providing the preview of printed output before performing printing by using the special-color recording material have been proposed (see Japanese Patent Laid-Open No. 2008-145784, for example). When printing and outputting print data by using the special-color recording material according to Japanese Patent Laid-Open No. 2008-145784, part of the print data, which is printed and output by using the special-color recording material, is detected in advance, and the detected part is displayed as a preview image by using a specified color or pattern.

Further, according to Japanese Patent Laid-Open No. 2008-145784, the off/auto/special-color settings can be made for displaying a preview image including the special-color recording material. For example, no preview image is displayed when the OFF setting is selected, and the color of part where the special-color material is adhered is detected and the preview image of a part having a color different from the detected color is displayed as a special-color part when the auto setting is selected. Further, when the special-color setting is selected, a position where the special-color recording material is adhered is displayed by using a color specified with a user.

When the effect of performing printing by using the special-color recording material is always constant (as is the case with solid shading performed by using a special-color orange or a special-color green, for example), a preview image provided to express the part where the special-color recording material is adhered may be generated according to the method disclosed in Japanese Patent Laid-Open No. 2008-145784. That is, a user can appropriately imagine the printing result based on specified colors or patterns that are displayed, as indicated by areas 101, 102, and 103 of FIG. 1. However, when performing printing by using transparent toner that has been available in the market in recent years, the reflectivity of light falling on the surface of a printed output can be changed. The above-described property of the transparent toner allows for applying a watermark pattern to the printed output and generating a decorative effect with texture. The transparent toner changes the light reflectivity based on the condition of an underlayer to which the transparent toner is applied. (Here, the term "underlayer" denotes the condition of the surface of a print medium (output sheet), which is attained before applying the transparent toner. An example of the property of the transparent toner, which changes the reflectivity based on the underlayer condition, will be described later.) When the transparent toner is applied to part of a sheet, a print effect achieved on the part through the use of the transparent toner is not always constant, which is different from the case where the solid shading is performed by using the special-color orange or the special-color green.

The light reflectivities that are changed based on the underlayer condition when printing is performed by using the transparent toner are illustrated in schematic diagrams 201, 202, 203, and 204 of FIG. 2 by the underlayer characteristics. The schematic diagram 201 illustrates the reflectivity of light falling on a printed output obtained by printing data on a sheet of paper having high smoothness, that is, coated paper by using the transparent toner.

No toner is used for a part (a) of the printed output at the printing time. Since the smoothness of the part (a) is still high, the reflectivity thereof is high. However, the transparent toner is used for a part (b) of the printed output at the printing time. The smoothness of the part (b) is lost due to asperities that are caused by the transparent toner, so that the light reflectivity is decreased.

On the other hand, the schematic diagram 202 of FIG. 2 illustrates the reflectivity of light falling on a printed output obtained by printing data on a sheet of paper having low smoothness, that is, mat paper by using the transparent toner.

Since the smoothness of the part (a) of the printed output, for which no toner is used at the printing time, is low, the reflectivity of the part (a) is also low. However, the printing is performed for the part (b) of the same printed output by using the transparent toner. Consequently, the asperities of the mat paper itself are smoothed so that the reflectivity is increased.

The schematic diagram 203 of FIG. 2 illustrates the case where data is printed on a print sheet by using toner including a coloring matter of which property is relatively similar to transparency, such as yellow toner. More specifically, the schematic diagram 203 illustrates the reflectivity of light falling on a part of the print sheet, where data is printed on the part by using the yellow toner, and other data is printed on the same part by using the transparent toner. The schematic diagram 203 illustrates the reflectivity of light falling on a part (a), which is attained when data is printed on the part (a) by using toner having the same property as that of the transparent toner, and other data is printed on the part (a) without using the transparent toner. The schematic diagram 203 illustrates the reflectivity of light falling on a part (b), which is attained when data is printed on the part (b) by using toner including a dye of which property is similar to that of the transparent toner, and other data is printed on the part (b) by using the transparent toner. The reflectivity of the part (a) is not significantly different from that of the part (b).

The toner including the dye of which property is similar to that of the transparent toner includes, for example, the yellow toner having a light-colored dye.

Usually, a comparison between a white color (a light-colored dye) and a black color (a dark-colored dye) shows that the light reflectivity of the black color is lower than that of the white color, because the black color absorbs more light than the white color. On the other hand, the light reflectivity of the white color is high, because the white color does not absorb light.

Since the yellow toner also has a light color, the light-absorption amount is little and the reflectivity is high, as is the case with the white color. Further, the transparent toner also has a light color and has the same property as that of the yellow toner.

Consequently, there is no difference between the light reflectivities that are obtained before and after the transparent toner having high reflectivity is adhered on the yellow toner having high reflectivity.

In relation to the schematic diagram 203 of FIG. 2, the schematic diagram 204 illustrates the light reflectivity attained in the case where data is printed on part of a print sheet by using toner including a dye of which property is different from that of the transparent toner, such as black toner, and other data is printed on the same part by using the transparent toner. The schematic diagram 204 illustrates the reflectivity of light falling on a part (a), which is attained when data is printed on the part (a) by using toner including a dye of which property is different from that of the transparent toner. The schematic diagram 204 also illustrates the reflectivity of light falling on a part (b), which is attained when data is printed on the part (b) by using toner including a dye of which property is different from that of the transparent toner, and other data is printed on the same part (b) by using the transparent toner. As is clear from the parts (a) and (b), the light reflectivities of the parts (a) and (b) are different from each other.

The reason why the above-described difference occurs is that the transparent toner having a high light reflectivity is adhered on the black toner that includes a dark-colored dye of which property is different from that of the transparent toner, that absorbs light, and that has a low light reflectivity, which is opposite to the case illustrated in the schematic diagram 203.

Thus, the properties of some of the special-color recording materials allow for changing effects that are produced on a finished printed output depending on the underlayer condition. When printing is performed by using the special-color recording material having the above-described property, it is difficult to make a user imagine the print result clearly by merely displaying a preview image produced before the printing is executed, where the preview image illustrates a part where the special-color recording material is printed by using a specified color.

Further, when the special-color recording material includes the same transparent coloring material as that of clear toner and a preview image is displayed, the preview image illustrating a part where the special-color recording material is applied only by using a substitute color that had already been set, an object including a coloring material other than the special-color recording material, the object being printed on the background, is hidden behind the substitute color image. Consequently, the print result which is significantly different from an output that shall be actually printed is presented as the preview image, which also makes it difficult for the user to imagine the print result.

SUMMARY OF THE INVENTION

Accordingly, one aspect of the present invention provides a preview image before printing is performed by using a special-color recording material that changes the finish effect of a printed output depending on the underlayer condition, where the preview image is used to edit print data used to perform the printing. Further, the present invention provides a preview image which allows a user to edit print data while confirming the degree of effect caused by the special-color recording material, the effect being produced on a part where the print data is printed by using the special-color recording material.

Another aspect of the present invention provides an image processing apparatus including a specification unit configured to specify a region where printing is performed by using a transparent recording material in image data-for-outputting, a comparison unit configured to compare a first reflectivity obtained when printing is performed for the specified region by using the transparent recording material with a second reflectivity obtained when printing is performed for the specified region without using the transparent recording material, a determination unit configured to determine use of a first display form when the comparison made with the comparison unit indicates that the first reflectivity is higher than the second reflectivity and determine use of a second display form when the comparison made with the comparison unit indicates that the first reflectivity is lower than the second reflectivity, and a display unit configured to display the specified region by using a display form determined through the determination unit.

When print data used to perform printing by using the special-color recording material is edited before performing the printing, the present invention allows for performing the editing while confirming the degree of effect caused by the special-color recording material, the effect being produced on a part where the printing is performed by using the special-color recording material. Accordingly, it becomes possible to perform the editing while confirming a printed output obtained after the printing is performed.

Further features of the present invention will become apparent from the following description of exemplary embodiments with reference to the attached drawings.

BRIEF DESCRIPTION OF THE DRAWINGS

FIG. 4 illustrates exemplary lookup-table data.

FIG. 17 illustrates an example where the reflectivity is acquired from the lookup-table data.

FIG. 18 illustrates another example where the reflectivity is acquired from the lookup-table data.

DESCRIPTION OF THE EMBODIMENTS

Hereinafter, embodiments of the present invention will be described with reference to the attached drawings. The appended claims of the present invention are not limited to the following embodiments, and all of combinations of features described in the embodiments are not necessarily mandatory for achieving the present embodiment.

Although transparent toner is used as a special-color recording material in the following embodiments, any other recording material may be used in another embodiment of the present invention, so long as the recording material changes the light reflectivity depending on the underlayer condition. For example, light-colored toner, clear ink, and so forth may be used.

Figure 1:
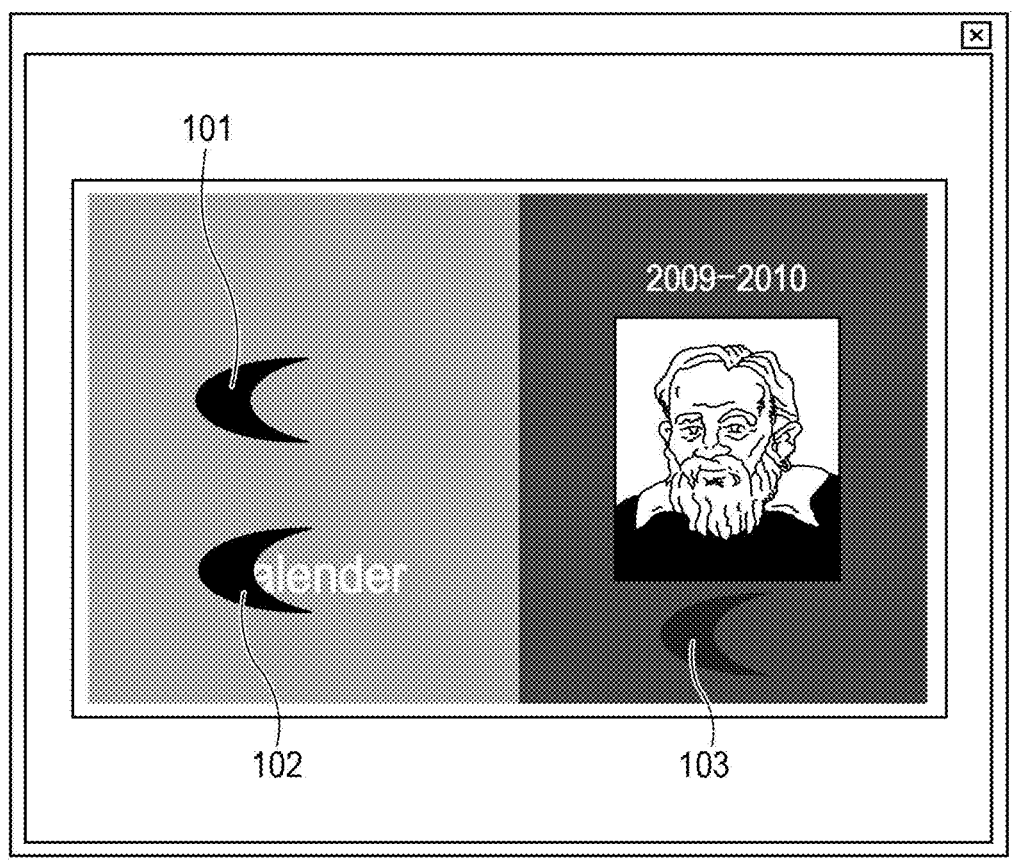
FIG. 1 illustrates an exemplary problem which is solved according to an embodiment of the present invention.
Figure 2:
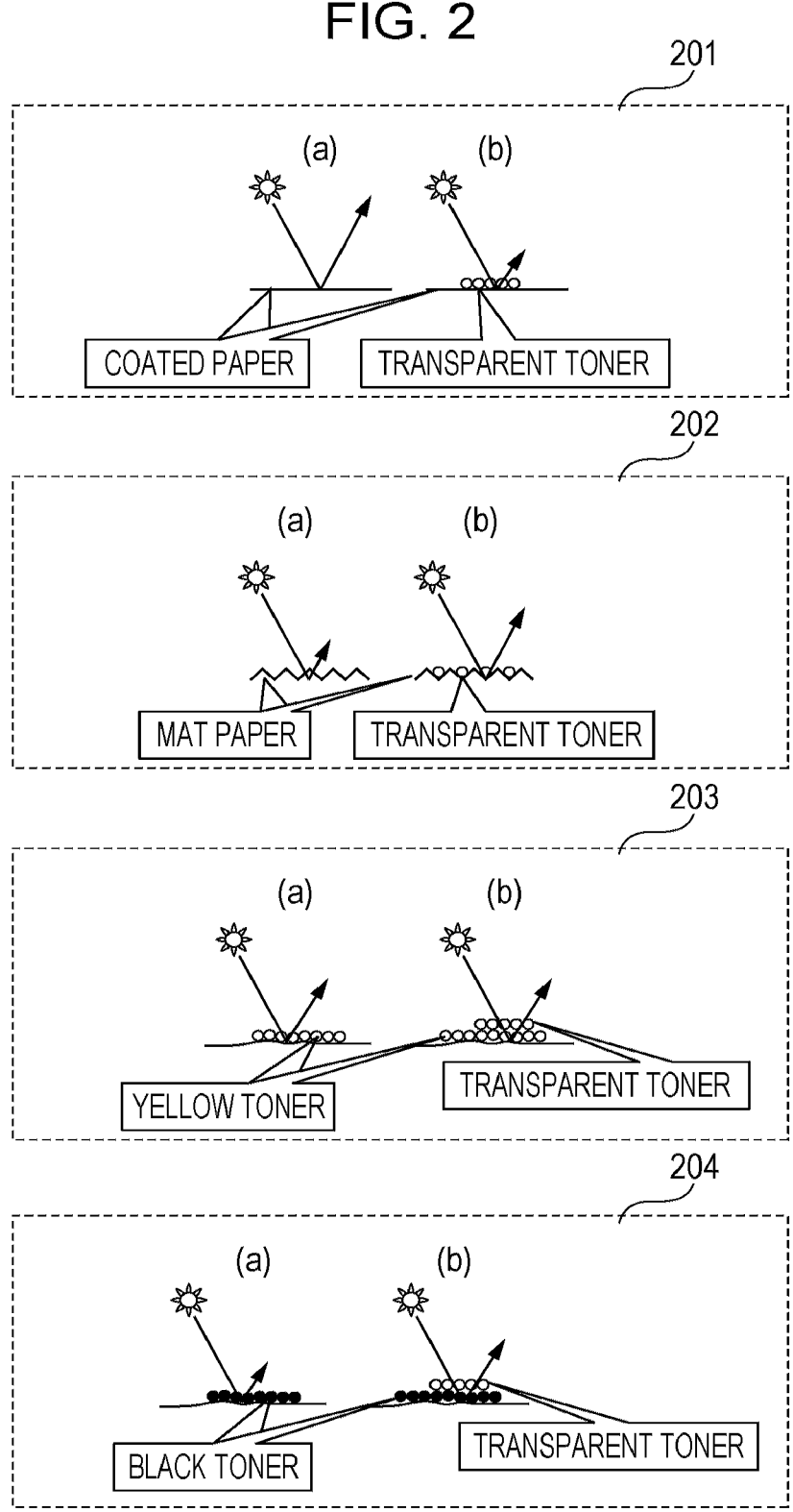
FIG. 2 illustrates exemplary light-reflection performances.

Further, in the following embodiments, the difference between reflectivities occurring in a printing-target part before and after printing is performed by using the transparent toner as illustrated in the schematic diagrams 201 to 204 of FIG. 2 is defined as a "gloss difference". The occurrence of the gloss difference depends on the relationship between the transparent toner and the underlayer condition, and the magnitude of the gloss difference is changed based on the difference between the transparent toner and the underlayer condition.

Although the gloss difference is quantitatively discussed in the following embodiments of the present invention, the gloss difference is defined as the difference between light reflectivities that are attained before and after printing is performed by using the transparent toner. Since the light reflectivities are expressed as percentages, the gloss difference, which is the difference between the light reflectivities, can also be expressed as a percentage. Further, the reflectivity difference is proportional to the difference between asperities of the surface of an output sheet, the asperities being observed before and after the transparent-toner printing is performed.

Figure 3:
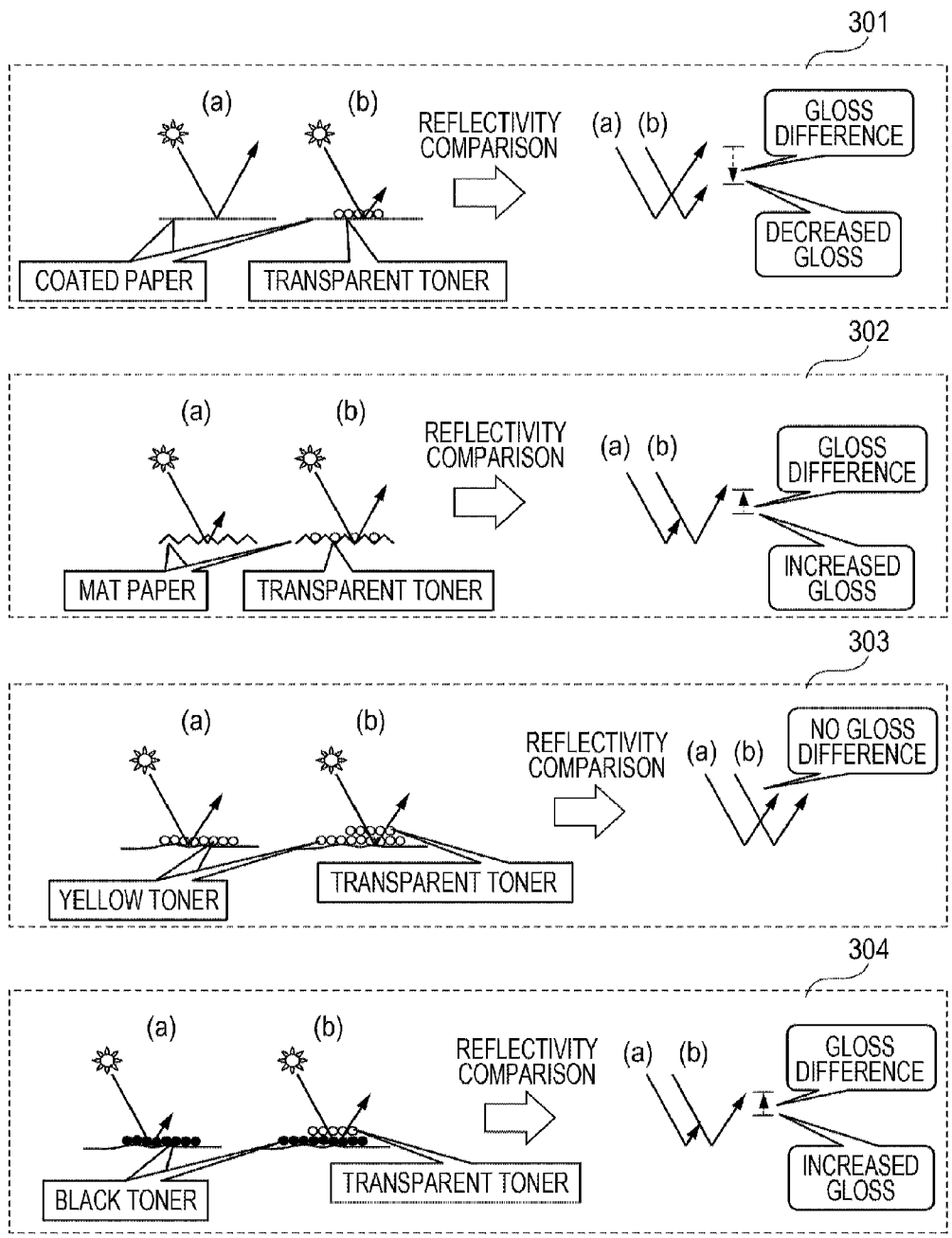
FIG. 3 illustrates other exemplary light-reflection performances.

FIG. 3 schematically illustrates the gloss differences corresponding to the individual schematic diagrams 201 to 204 of FIG. 2. A schematic diagram 301 indicates the state where printing is performed by using the transparent toner so that the reflectivity becomes lower than in the case where printing is performed without using toner ((a)>(b)). The above-described state is expressed as "DECREASED GLOSS".

Each of schematic diagrams 302 and 304 illustrates the state where printing is performed by using the transparent toner so that the reflectivity becomes higher than in the case where printing is performed without using the transparent toner (((a)<(b)). The above-described state is expressed as "INCREASED GLOSS". A schematic diagram 303 illustrates the state where there is no difference between the reflectivity obtained when printing is performed by using the transparent toner and that obtained when printing is performed without using the transparent toner ((a)=(b)). The above-described state is expressed as "NO GLOSS DIFFERENCE".

Hereinafter, an image processing apparatus capable of performing printing by using the special-color recording material will be described in each of the following embodiments. The image processing apparatus has the function of producing the preview of an image that shall be printed by using the special-color recording material. However, as illustrated in the schematic diagrams 201 to 204 of FIG. 2, the following processing procedures are performed for a preview image including the special-color recording material that causes the finish effect of a printed output to change depending on the underlayer condition.

A series of the above-described processing procedures will be briefly described.

First, content data including recording materials other than the special-color recording material is displayed as the intensity of a single color, as is the case with the gray-scale display. A part where the special-color recording material is adhered is expressed by using a color different from the single color.

Then, "lookup-table data including data related to the light reflectivity" is held, and the gloss difference is calculated based on the lookup-table data for each of the case where printing is performed by using the special-color recording material and the case where printing is performed without using the special-color recording material.

When printing is performed by using the special-color recording material and the gloss is increased, a first pattern is selected. When the gloss is decreased, a second pattern is selected. For example, first and second colors are selected.

Further, a density (transparency) is given to the selected first color or second color based on the degree of the defined gloss difference (the difference magnitude) for display. (The method of giving the density to the selected color will be described later.)

The "lookup-table (LUT) data including data related to the light reflectivity" denotes information-table data including data relating to the light reflectivity which is changed depending on various conditions (the paper type, the irradiation angles of the light source, the adhesion amounts of CMYK toner, the adhesion amounts of the transparent toner, etc.).

The lookup-table data is often generated based on the values of actual measurement of a printed color chart, the actual measurement being made with an optical-measuring device, or the values of logical measurement made with a coloring-material simulator or the like. The coloring-material simulator makes measurement through a computer instead of making actual measurement. In that case, data on the properties of various types of paper (indicating asperities or the like) or those of various colors (refractive indices, reflection properties (spectrums)) is input to the coloring-material simulator. Then, the coloring-material simulator automatically calculates the light-reflection properties corresponding to combinations of the amounts of toner adhered on a given type of paper, which are expressed as CMYK (0,0,0,0)→CMYK (50%, 50%, 50%, 50%),→CMYK (100%, 100%, 100%, 100%). That is, the LUT data is automatically obtained. Further, when data of the light reflectivity is added to the LUT data, the light-reflectivity data is converted into a form used for an optical model achieved by generalizing the light reflectivities, such as the bidirectional reflection distribution function, and only the parameter of the function of the model is added to the LUT data.

Further, when converting data of the result of the actual measurement made with the optical-measuring device into the optical model, the parameter of the function of a target model is determined by making approximations according to, for example, the least squares method in ordinary cases.

A large number of models relating to the light reflectivity, including simple models such as Fresnel reflection, have been available. In the following embodiments, any model can be used so long as the model can obtain the light reflectivity appropriate to calculate the gloss difference.

FIG. 4 schematically illustrates one of the LUT data generated in the above-described manner. According to the LUT data, the parameters of the functions of the target model are given to a combination of conditions, as illustrated in columns 401, 402, 403, 404, 405, 406, 407, and 408. Further, actual LUT data is file data showing a list of conditions and parameters that can be read only by the image processing apparatus. For the image processing apparatus that can use the LUT data, the following data should be provided as appropriate conditions for calculating the light reflectivity. More specifically, data on a print-output sheet type 401, a light-source incident angle 402, a cyan-toner adhesion amount 403, a magenta-toner adhesion amount 404, a yellow-toner adhesion amount 405, a black-toner adhesion amount 406, and a transparent-toner adhesion amount 407 is provided. In the following embodiments, processing procedures are performed based on the premise that the LUT data including data of the parameters of the functions of a target model, the parameters being given to combinations of the above-described conditions (408), is stored in a memory which is provided in the image processing apparatus or connected to the image processing apparatus via a network.

Figure 12:
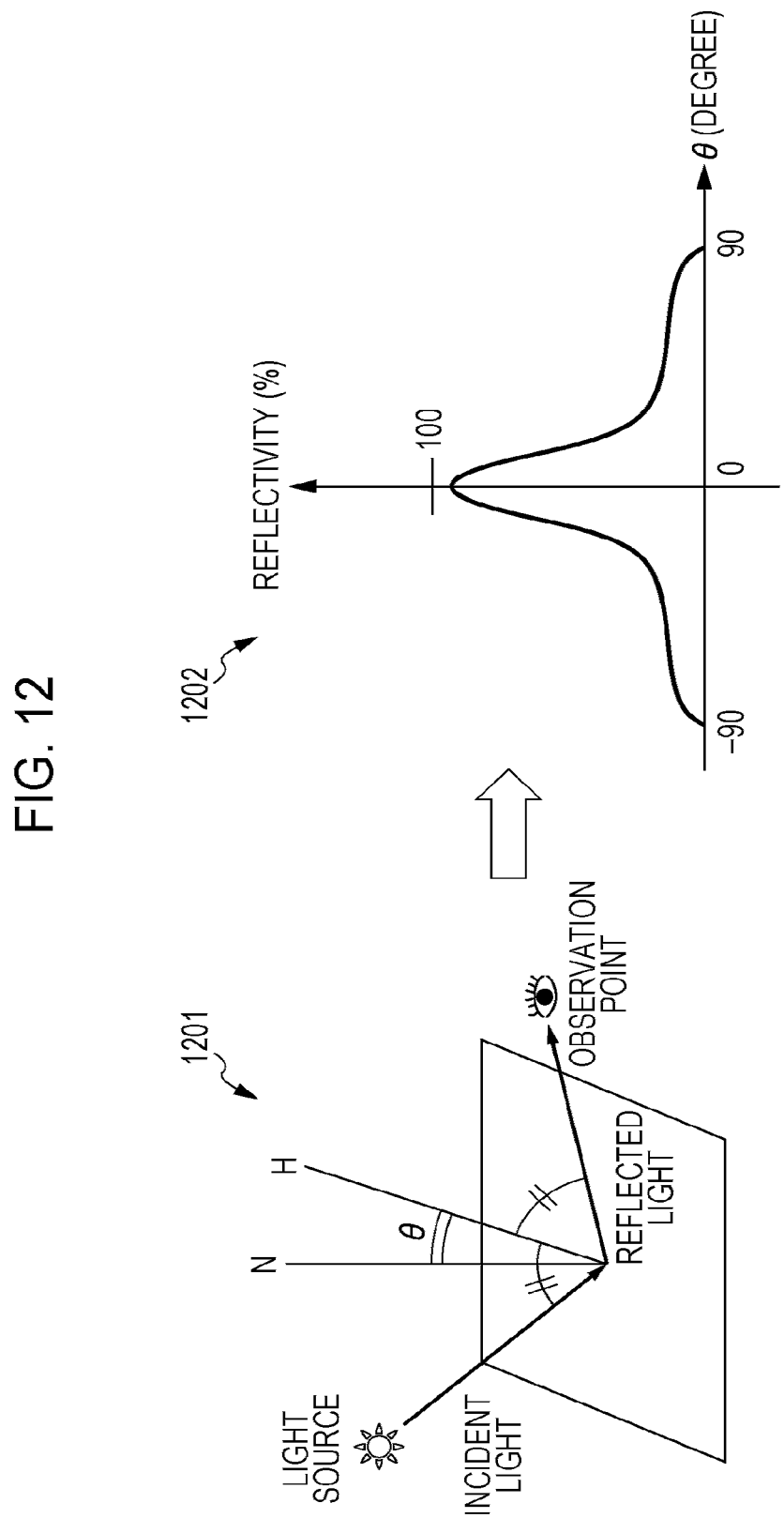
FIG. 12 includes schematic diagrams of the light reflection.

Since data of the conditions is added to the LUT data of the present embodiment, the parameters of the functions of the target model can be acquired from the LUT data. Further, substituting the parameters into the functions of the model allows for calculating the reflectivity corresponding to each condition of the underlayer. Although depending on optical models for use, a light-reflection phenomenon occurs depending on a relationship illustrated in FIG. 12 in simple terms. A schematic diagram 1201 illustrates the light reflection. The sign N denotes a surface normal, and the sign H denotes a bisector dividing an angle which the light-source incident direction forms with the observation direction of an observer, and the sign θ denotes an angle which the surface normal N forms with the bisector H. At that time, the relationship between the light-source reflectivity and the angle θ yields a result illustrated in a schematic diagram 1202. The result is changed based on the parameters of the functions of the target model, which are obtained based on the above-described conditions.

Figure 13:
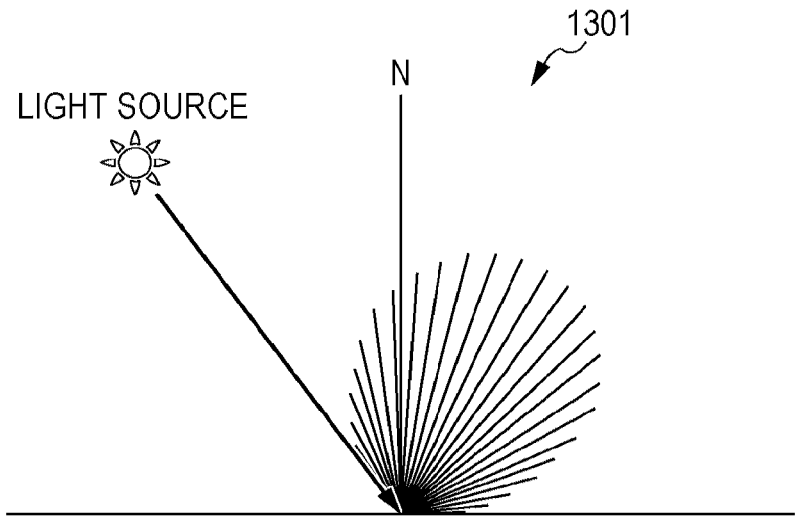
FIG. 13 is another schematic diagram of the light reflection.
Figure 14:
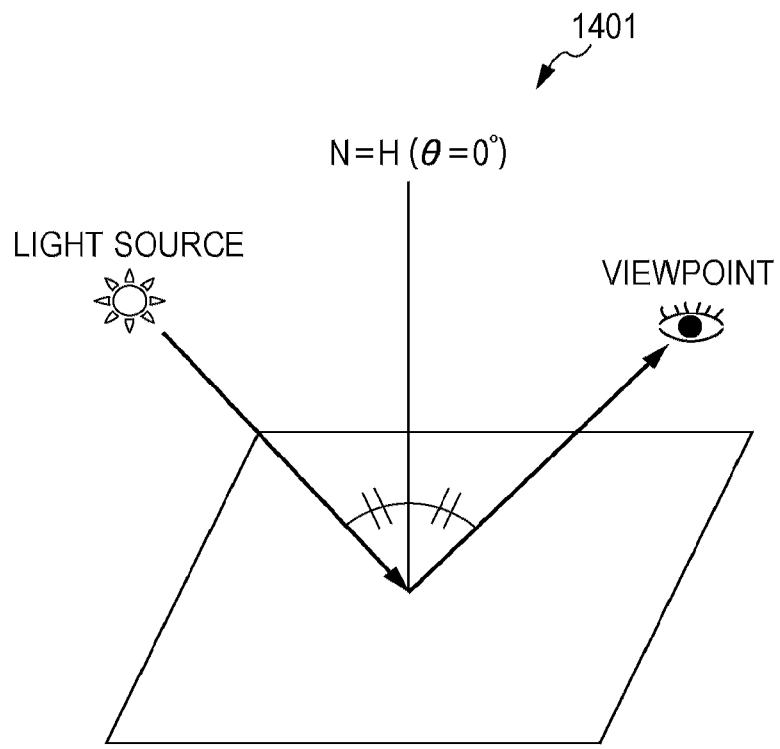
FIG. 14 is another schematic diagram of the light reflection.

As described above, the reflectivity attained at the same position varies depending on the angle θ which the surface normal N forms with the bisector H. A schematic diagram 1301 of FIG. 13 illustrates the reflectivities of light reflected in every angle. Thus, the reflectivities of light reflected in every angle can be attained at the same position. Therefore, the gloss difference should be calculated with reference to a specified angle. For example, when the angle θ=0° is determined to be a reference angle as illustrated in a schematic diagram 1401 of FIG. 14, a difference attained at the peak of the light reflectivity is obtained as the property of the gloss difference.

First to fourth embodiments of the present invention will be described with reference to the LUT data and the optical model that are defined as stated above.

First Embodiment

Exemplary Configuration of Image Processing Apparatus of First Embodiment

Figure 5:
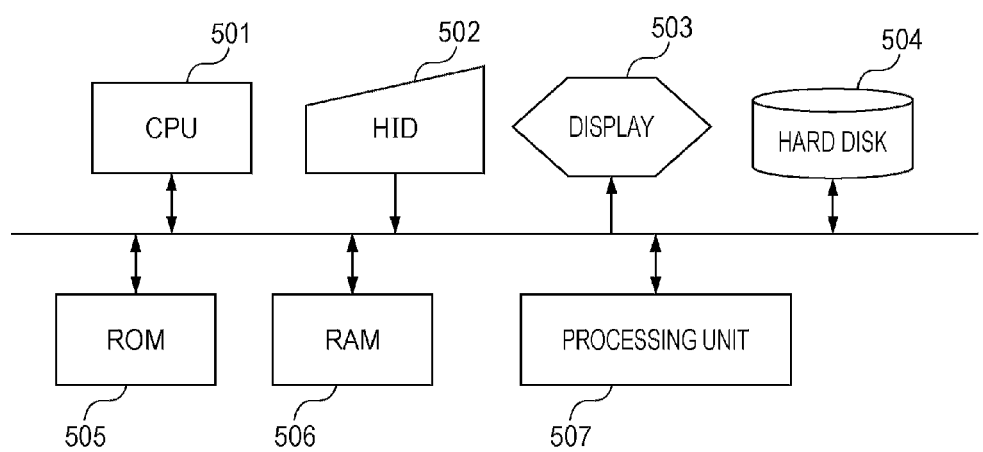
FIG. 5 illustrates an exemplary hardware configuration.

FIG. 5 is a block diagram illustrating an exemplary configuration of an image processing apparatus according to a first embodiment of the present invention. The image processing apparatus includes an operation-control CPU 501 and a human-interface device 502 provided to input data and instructions. The human-interface device 502 includes a keyboard, a mouse, a touch panel, and so forth. The image processing apparatus further includes a display 503 provided to display image data of the image processing apparatus, a hard disk 504 storing all types of data including the LUT data or the like, a ROM 505 where programs controlling the image processing apparatus or appropriate information had already been stored, a RAM 206 used as various work areas, and a processing unit 507.

The processing unit 507 of the image processing apparatus is achieved by the CPU 501 executing a computer program stored in the ROM 505. That is, the computer program can make a computer function as the processing unit 507. Further, a computer-readable recording medium storing the computer program is not limited to the ROM 505. That is, the computer-readable recording medium may be the hard disk 504, for example.

In the following embodiments, the transparent toner is used as the special-color recording material. However, the special-color recording material may be toner, ink, and so forth other than the transparent toner, so long as they can change the gloss of a medium including a print sheet or the like, or that of a medium on which toner or the like is adhered. For example, a different special-color recording material including a light-colored toner, transparent ink, etc. may be used in addition to the transparent toner.

Figure 6:
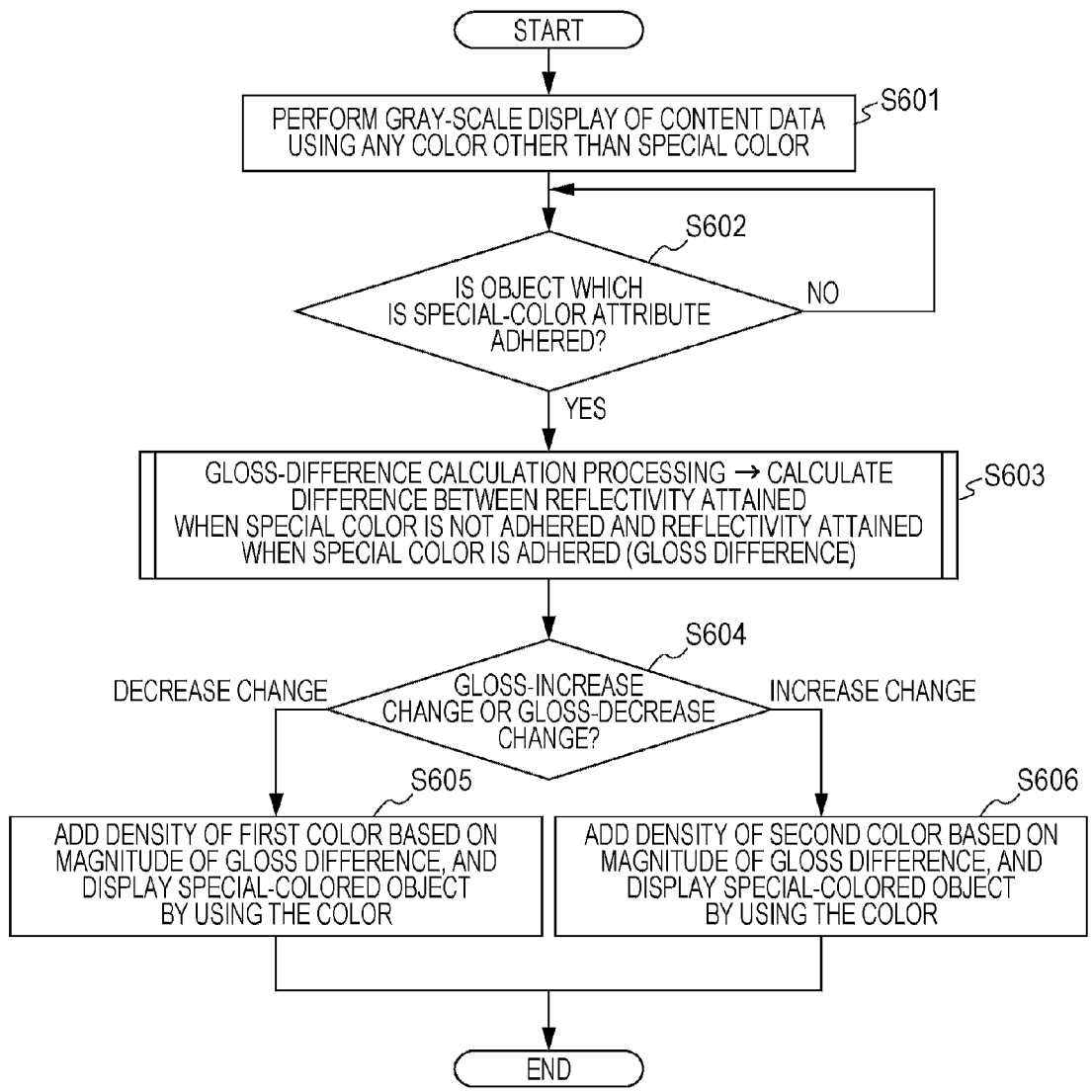
FIG. 6 is a flowchart illustrating processing procedures of an image processing apparatus.

Exemplary Operations of the Image Processing Apparatus of the Present Embodiment FIG. 6 is a flowchart illustrating operations of the image processing apparatus of the present embodiment. A user of the image processing apparatus operates the human-interface device 502 while confirming the display 503 so that processing procedures are performed.

Figure 8:
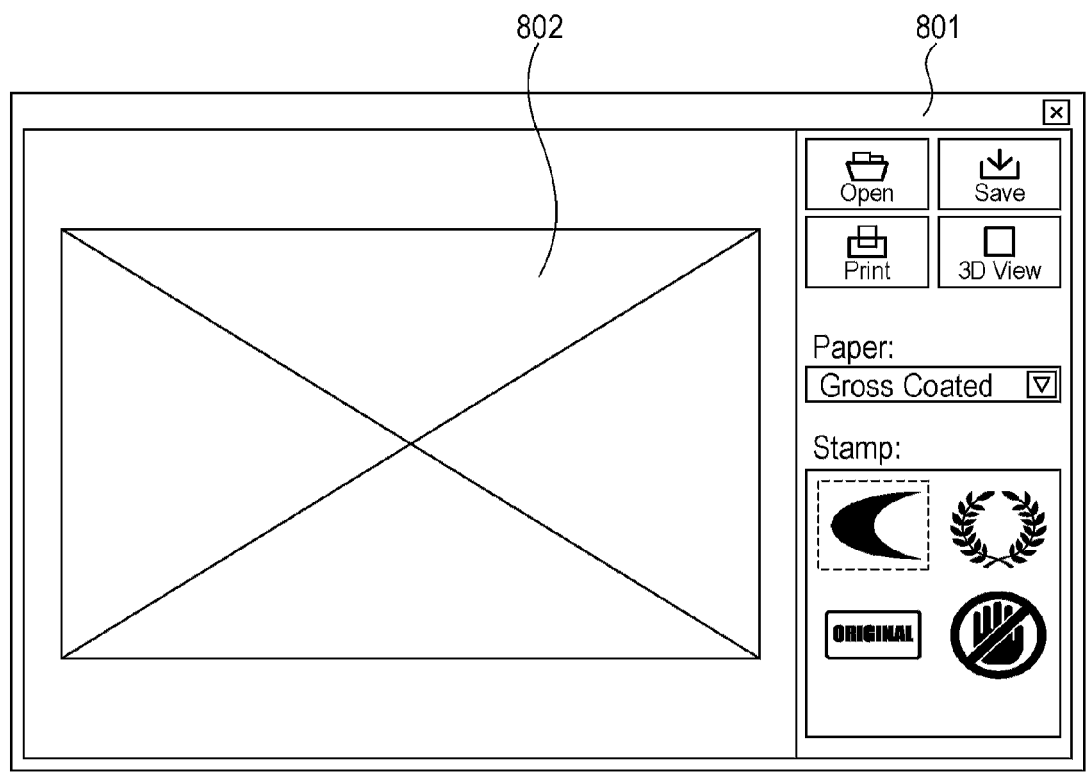
FIG. 8 illustrates an exemplary user interface.

First, the image processing apparatus is provided with windows and an interface, as indicated by the sign 801 of FIG. 8, and captures drawable electronic-document data, such as portable document format ("PDF (Registered Trademark of Adobe Systems Incorporated.)") data. Then, the drawable electronic-document data is displayed on an area 802 so that the processing procedures are started. Without being limited to the PDF data, any type of drawable data can be captured by the image processing apparatus as is the case with the PDF data. Further, the drawable electronic-document data is converted into drawing data displayed by using the CMYK colors provided as process colors, because the sizes of channels of the individual CMYK colors correspond to the adhesion amounts of the cyan toner, the magenta toner, the yellow toner, and the black toner.

Figure 16:
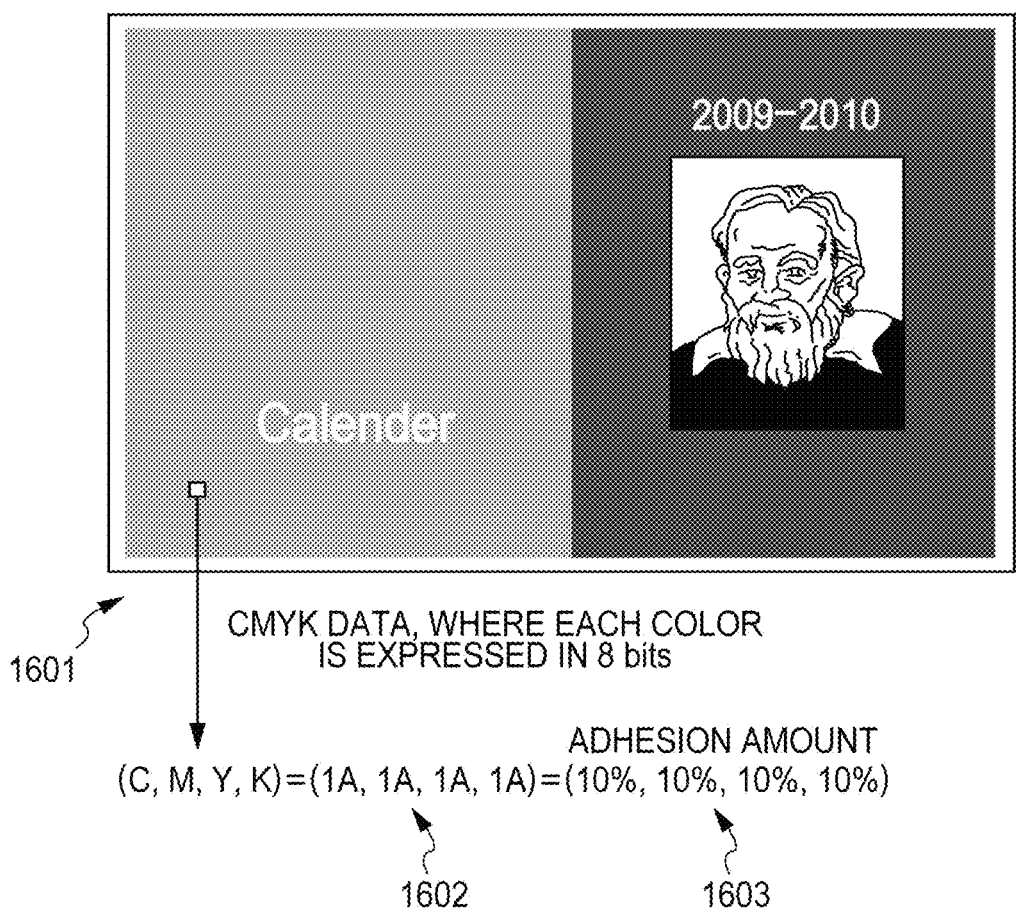
FIG. 16 illustrates an example where the sizes of channels of CMYK colors are converted into the CMYK-toner adhesion amounts for a specified pixel.

FIG. 16 illustrates an example where the sizes of channels of the CMYK colors are converted into the CMYK-toner adhesion amounts for a specified pixel. A pixel 1601 is extracted from CMYK-drawing data, where each of the CMYK colors is expressed in 8 bits, and the channel sizes 1602 of the pixel 1601 are acquired. Since the drawing data is displayed by using the CMYK colors, where each color is expressed in 8 bits, the adhesion amounts of the CMYK toner of the pixel 1601 are acquired based on the channel sizes 1602. In that case, the adhesion amounts become those indicated by the sign 1603.

Figure 9:
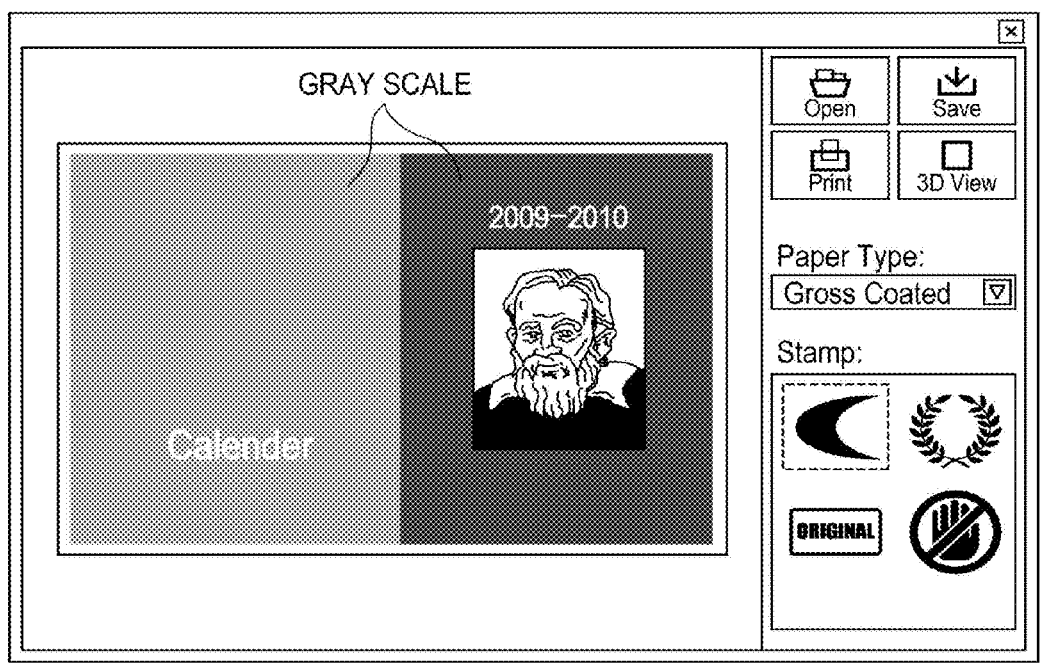
FIG. 9 illustrates another exemplary user interface.

At step S601, the captured electronic-document data is displayed on the area 802, as the intensity of a single color by using gray-scale or the like as illustrated in FIG. 9. Consequently, when settings on the printing performed by using a special-color recording material are made by performing operations in the future, the legibility of a part where the special-color recording material is printed is increased.

At step S602, it is determined whether or not the setting of printing the special-color recording material is made. In the present embodiment, a specific example of the method of setting a region where the special-color recording material is printed is illustrated in FIG. 10.

Figure 10:
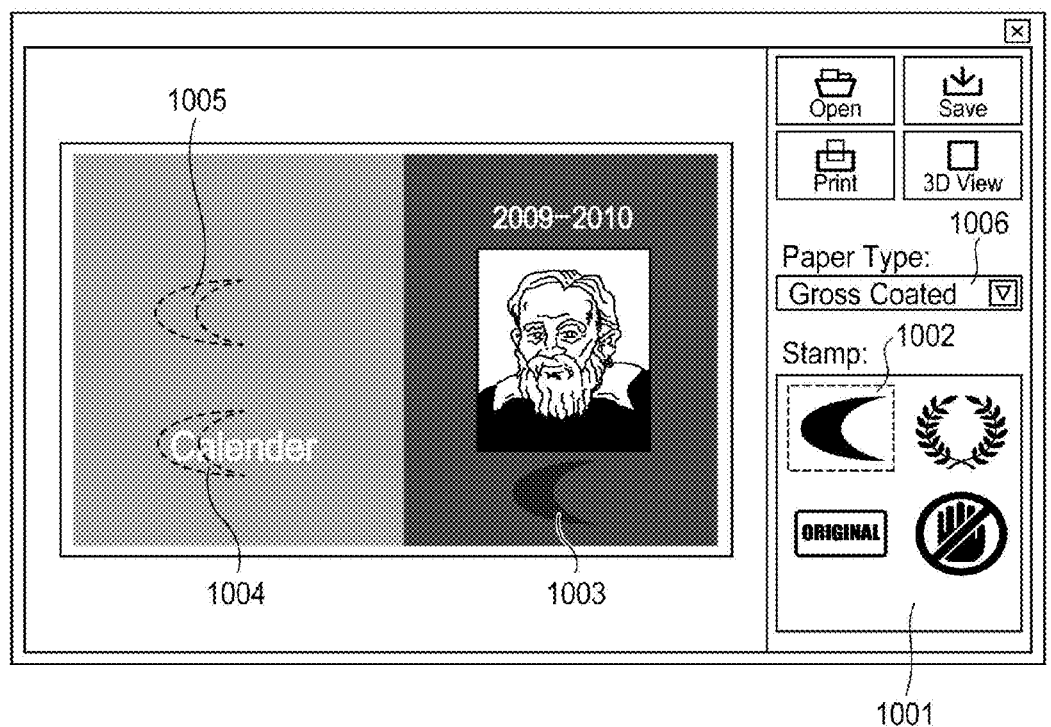
FIG. 10 illustrates another exemplary user interface.

For example, FIG. 10 exemplarily illustrates a display image screen 1001 including annotation-format stamp objects. The user moves a stamp object which is specified and selected from among the above-described stamp objects via the human-interface device 502 into image data-for-outputting by performing operations, such as drag and drop. Thus, the region where the special-color recording material is printed is set.

In another case, a stamp object 1002 may be dragged and dropped into arbitrary positions 1003, 1004, and 1005 so that the stamp objects are printed. Here, a template which allows for decorating the entire surface of a display screen image may be prepared to make settings on the printing performed by using the special-color recording material. That is, the use of the special-color recording material is not limited to the case where the special-color recording material is scattered, as is the case with the stamp objects.

Figure 7A:
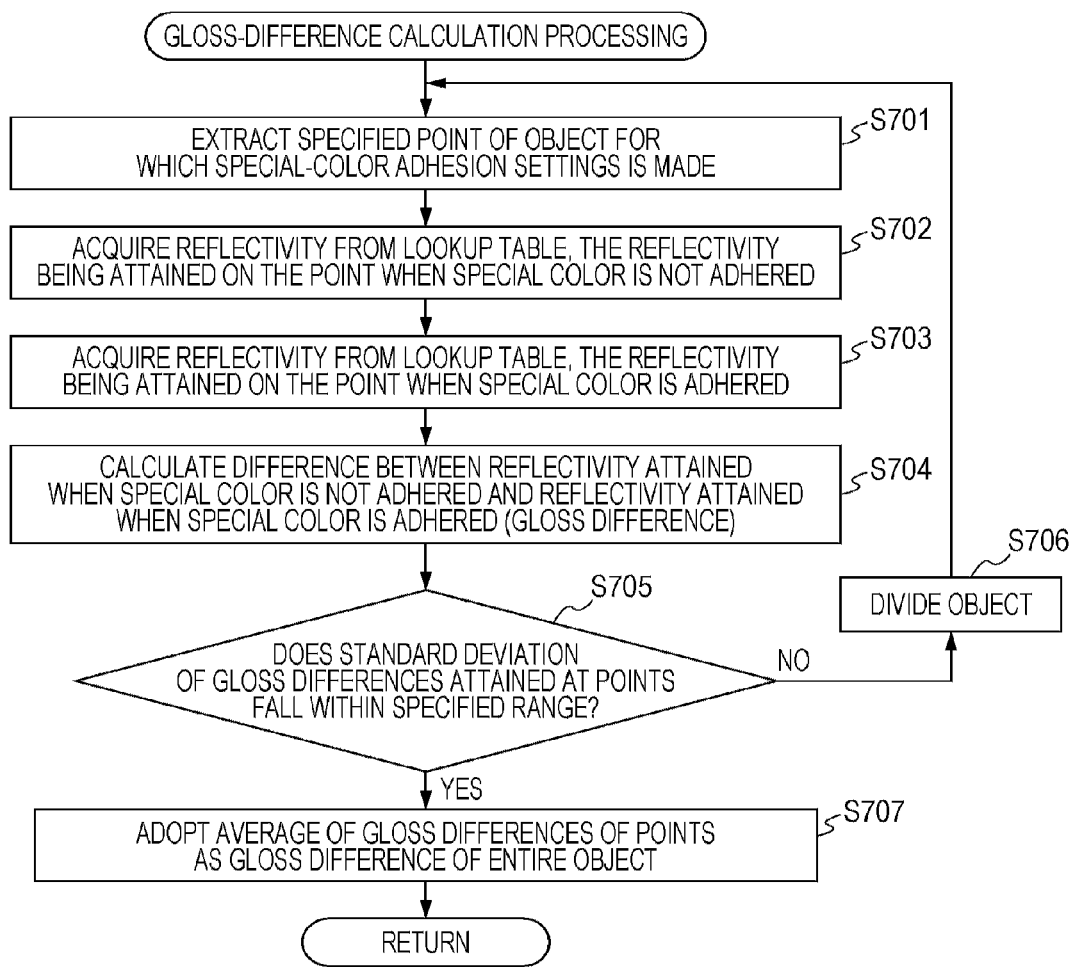
FIG. 7A is a flowchart illustrating processing procedures of the image processing apparatus, which are performed to calculate the gloss difference.

At step S603, processing is performed to calculate the gloss difference occurring in the region where the special-color recording material is printed, the region being set at step S602. The details of the processing performed at step S603 will be described with reference to a flowchart illustrated in FIG. 7A.

Figure 7B:
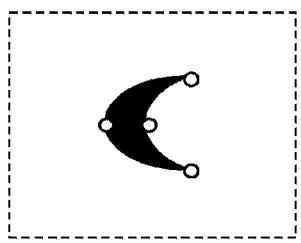
FIG. 7B is a supplement to FIG. 7A.

At step S701, data of a specified point of an object which is a region where the special-color recording material shall be printed is extracted. An exemplary method of extracting the specified point is described below. When the above-described object is a stamp object as illustrated in FIG. 7B, a control point included in the graphics of the stamp object should be determined to be the specified point. The gloss-difference calculation is performed not for every pixel, but for a specified point only, the specified point being set in advance. Consequently, the processing is performed with increased speed.

At step S702, the light reflectivity is acquired at the specified point in the state where no special-color recording material is printed.

For acquiring the light reflectivity, first, parameters that are appropriate for the state where the special-color recording material is not adhered on the specified point (the paper type, the light-source irradiation angle, and the CMYK-toner adhesion amounts) are acquired with reference to the LUT data as illustrated in FIG. 17 (e.g., parameters 1701). Then, the parameters are substituted into the functions of an optical model which is determined to be a target through the image processing apparatus so that the reflectivity is obtained. (For example, the result of substituting the parameters into functions 1702 is 50%.) Further, for acquiring the parameters with reference to the LUT data, an interface 1006 illustrated in FIG. 10 is provided in the image processing apparatus so that the user selects the paper type therefrom. Further, the CMYK-toner adhesion amounts are acquired from the drawable electronic-document data as state above.

At step S703, the light reflectivity is acquired at the specified point in the state where printing is performed by using the special-color recording material. As illustrated in FIG. 18, parameters that are appropriate for the state where the special-color recording material is adhered on the specified point (the paper type, the light-source irradiation angles, the CMYK-toner adhesion amounts, and the transparent-toner adhesion amounts) are acquired from the LUT data (e.g., parameters 1801). Then, the parameters are substituted into the functions of an optical model which is determined to be a target through the image processing system so that the reflectivity is obtained. (For example, the result of substituting the parameters into functions 1802 is 80%.)

In the image processing apparatus of the present embodiment, there are two types of specifications about the adhesion amount of the special-color recording material, which are expressed as "the special-color recording material is adhered (100%) and not adhered (0%). According to another embodiment of the present embodiment, however, a different system that can adjust the adhesion amount may be used (so that the user can select an arbitrary value from among 0% to 100%, for example).

At step S704, the gloss difference is calculated by obtaining the difference between the reflectivity acquired at step S702 and that acquired at step S703.

Figure 7C:
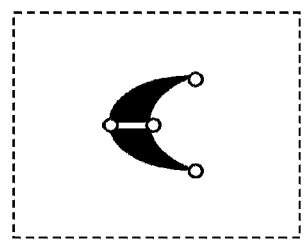
FIG. 7C is another supplement to FIG. 7A.

At step S705, the standard deviation of the gloss differences that are calculated at points that are illustrated in FIG. 7B and/or FIG. 7C (variations in the values of the gloss differences that are calculated at the points) is obtained. When the value of the standard value is smaller than a predetermined value, it is determined that the variations are insignificant, and the processing advances to step S707.

On the other hand, when the value of the calculated standard deviation is larger than the predetermined value, it is determined that the variations are significant, and the processing advances to step S706. Here, the predetermined value of the standard deviation may be set in advance in the image processing apparatus, or set by the user.

The processing corresponding to step S706 is performed after it is determined that the value of the standard deviation is larger than the predetermined value at step S705. At step S706, therefore, a link is established between the points so that the object is divided into two objects as illustrated in FIG. 7C, and steps S701 to S705 are performed again for each of the two objects.

When the object is not allowed to be divided, because the number of the points for which the gloss differences are calculated before dividing the object is three or less, for example, the processing may advance to step S707 even though the answer to the determination made at step S705 is No. Further, for performing the processing with increased speed, the number of loops occurring due to step S705 may be limited. When the loop number reaches a specified number, the processing may advance to step S707 even though the answer to the determination made at step S705 is No.

At step S707, the average of the gloss differences that are calculated at the points is determined to be the gloss difference of the entire object range. When the object is divided into two objects at step S706, the gloss difference is calculated for each of the objects.

After the gloss-difference calculation is finished, the processing advances to step S604. At step S604, it is determined whether the gloss difference calculated at step S603 is a change occurring due to the special-color recording material used for printing, by which the gloss is decreased and becomes lower than that attained when printing is performed without using the special-color recording material, or a change occurring due to the special-color recording material used for printing, by which the gloss is increased and becomes higher than that attained when printing is performed without using the special-color recording material.

When the object is divided into two objects at step S603, the above-described determination is made for each of the objects.

When the gloss difference is a change occurring due to the use of the special-color recording material, the change making the gloss lower than that attained when printing is performed without using the special-color recording material as illustrated in the schematic diagram 301 of FIG. 3, the processing advances to step S605.

Further, when the gloss difference is a change occurring due to the use of the special-color recording material, the change making the gloss higher than that attained when printing is performed without using the special-color recording material as illustrated in the schematic diagram 302 of FIG. 3, the processing advances to step S606.

The color used for a preview image displayed when the processing advances to step S605 (the gloss is decreased, that is, the mat feeling is developed by printing the special-color recording material) is different from that used for a preview image displayed when the processing advances to step S606 (the gloss is increased, that is, the gloss feeling is developed by printing the special-color recording material).

Figure 11:
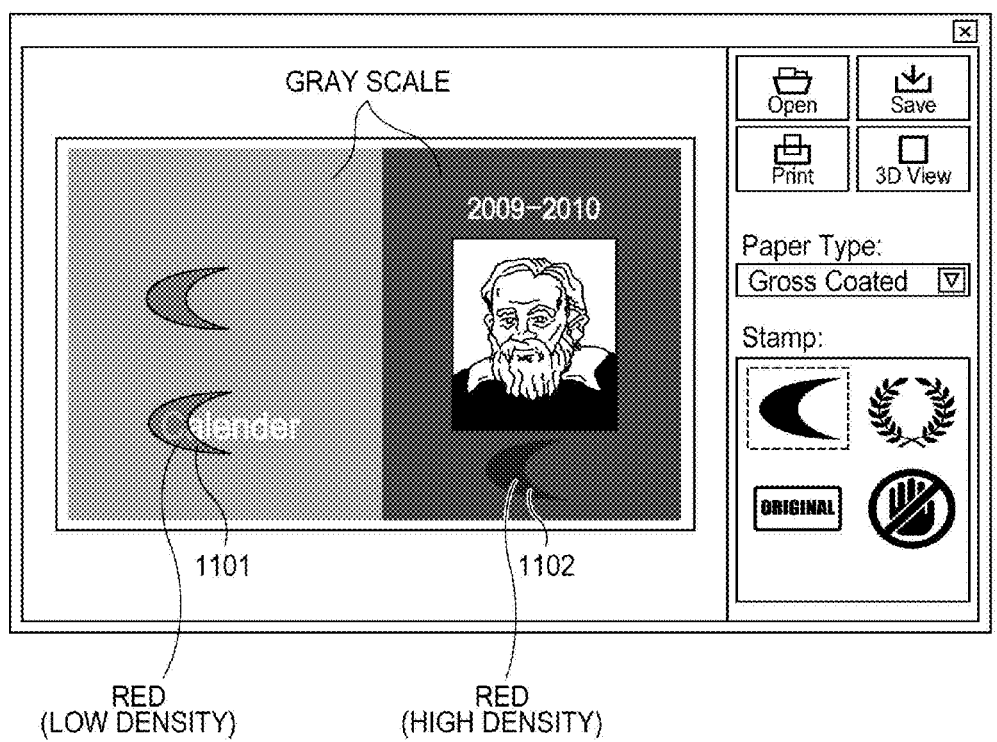
FIG. 11 illustrates another exemplary user interface.

At step S606, a red color is used for display for a position where printing is performed by using the special-color recording material. For example, when the use of the special-color recording material develops the gloss feeling in regions 1101 and 1102 that are illustrated in FIG. 11, a red color is used for a preview image of the regions.

On the other hand, when the processing advances to step S605, a blue color is used for display for a position where printing is performed by using the special-color recording material.

Further, when colors are used for display, the density of the colors is increased as the magnitude of the gloss difference is increased. That is, the density of colors that are used for a preview image is increased with an increase in the effect of the special-color recording material.

At that time, the gloss difference that had been calculated at step S603 is used to determine the density. For example, the magnitude of the gloss difference of the region 1101 of FIG. 11 is low. Therefore, a preview image is displayed by using the red color to express a part where the gloss is increased, and the density of the red color is decreased to indicate that the magnitude of the gloss difference is low (the effect of the special-color recording material is insignificant).

Further, the magnitude of the gloss difference of the region 1102 of FIG. 11 is high. Therefore, a preview image is displayed by using the red color to express a part where the gloss is increased, and the density of the red color is increased to indicate that the magnitude of the gloss difference is high (the effect of the special-color recording material is significant).

At that time, the density may be the gloss difference calculated as a percentage. As the magnitude of the gloss difference is increased, the density of the displayed color is increased in proportion to the gloss difference. Although the density is not proportional to the gloss difference, the density of the displayed color may be decreased as the magnitude of the gloss difference is decreased in stages.

When the magnitude of the gloss difference is high, the difference between the case where the special-color recording material is used and the case where the special-color recording material is not used is significant. Therefore, the color density of the corresponding part is increased to express that the use of the transparent toner produces a large effect.

Further, in the present embodiment, the case classification is performed by making the color determination (the first color is determined to be blue, and the second color is determined to be red). However, without being limited to the colors, the case classification may be performed based on first and second patterns so that the case classification can be performed based on the pattern of the region display. In that case, the display form of the first pattern should be different from that of the second pattern to differentiate between two different patterns on a preview image.

Further, a region displayed according to the first pattern or the second pattern of performing printing by using the special-color recording material may be displayed as a transparent region. In that case, the transparent region and image data provided as the underlayer are superimposed on each other so that a region where the special-color recording material is adhered can be expressed while maintaining the legibility of the image data provided as the underlayer.

Figure 15:
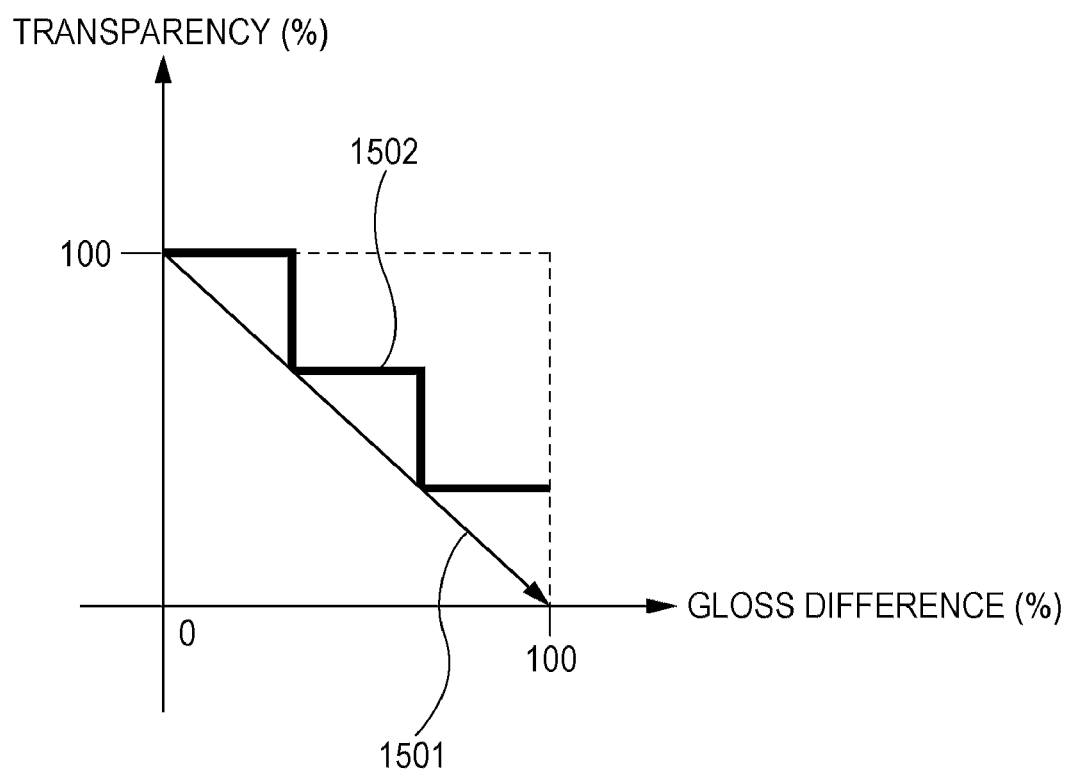
FIG. 15 illustrates the relationship between the transparency and the gloss difference.

At that time, the "transparency" is used for display in place of the above-described density. The transparency may be determined based on the equation "the transparency (%)=100 (%)–the gloss difference (%)" as indicated by an arrow 1501 illustrated in FIG. 15, for example. Further, the transparency may be determined based on a step function calculated based on the arrow 1501, as indicated by a stepped line 1502, so that the magnitude of the gloss difference can be expressed more clearly.

Then, in accordance with the calculated transparency, the transparency of the part corresponding to a gloss difference with high magnitude, the transparency being caused by the special-color recording material, becomes lower so that the underlayer becomes less visible. That is, the effect of the special-color recording material is significant. On the other hand, the transparency of the part corresponding to a gloss difference with low magnitude, the transparency being caused by the special-color recording material, becomes higher so that the underlayer becomes more visible. That is, the effect of the special-color recording material is insignificant.

Thus, when editing a printed output where a special-color recording material is adhered, the special-color recording material changing the finish effect of printing depending on the underlayer condition, the present embodiment allows for performing editing operations while confirming the degree of the effect of the special-color recording material, where the effect is observed on a region where printing is performed by using the special-color recording material. Consequently, a user can perform the editing operations while imagining the finish result of printing more appropriately.

Second Embodiment

At steps S605 and S606 of the first embodiment, the effect of the transparent toner is displayed by using the first and second patterns. Further, the magnitude of the gloss difference (the effect of the transparent toner) is displayed by providing the density to the first and second patterns. When the gloss difference is so insignificant that the threshold value thereof is less than 10%, for example, a second embodiment of the present invention allows for displaying the above-described state by using a pattern different from the first and second patterns so that the user can understand the above-described state more clearly. For example, when the value of the gloss difference is not greater than a predetermined value, the state of the gloss difference is displayed by using a third pattern different from the first and second patterns. Consequently, it becomes possible to warn the user in advance that it is difficult to obtain a desired print result even though printing is performed by using the special-color recording material. In that case, the user can set an arbitrary value in advance, as the threshold value of the gloss difference. Further, when the transparency is increased at a given part, the visibility of the given part is decreased. Therefore, a predetermined density is used for the third pattern.

Thus, the second embodiment allows for warning the user of the image processing apparatus that no gloss difference occurs.

Third Embodiment

At steps S605 and S606 of the first embodiment, the magnitude of the gloss difference is displayed by giving the density to the first and second patterns.

When the gloss difference is so insignificant that the value thereof is less than 10%, for example, it becomes difficult to confirm an object provided as a region where printing is performed by using the special-color recording material in a third embodiment of the present invention. Therefore, the value of the density of the border of the object where the special-color recording material is adhered is maximized for display. Consequently, the border of the displayed object is clarified so that the printing position is confirmed with facility.

Thus, according to the third embodiment, the user of the image processing apparatus appropriately recognizes the position of a region (object) where the density of a color used for a preview image is decreased due to a gloss difference with low magnitude, the region being displayed on an editing screen.

Fourth Embodiment

Image data including many colors, as is the case with a photograph taken by a digital still camera, is often printed on the underlayer of a region where printing is performed by using the special-color recording material on a print-output sheet. In that case, the property of the underlayer is diffused. Therefore, it is likely that the answer to the standard-deviation determination made at step S705 of the first embodiment is No and the standard-deviation determination is made in loop cycles. In that case, it takes much time to perform the processing, and errors can easily occur.

Accordingly, when image data is printed on the underlayer of a region where printing is performed by using the special-color recording material, the processing may advance to step S707 even though the answer to the determination made at step S705 is No. Further, the processing may advance to step S707 by providing a desired value as the value of the gloss difference without performing the processing of step S705.

Thus, according to a fourth embodiment of the present invention, the image processing apparatus can generate a preview screen with increased speed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192399 filed Aug. 30, 2010, which is hereby incorporated by reference herein in its entirety.

What is claimed is:

1. An image processing apparatus comprising:
a specification unit configured to specify a region where printing is performed by using a transparent recording material in image data-for-outputting;
a comparison unit configured to compare a first reflectivity obtained when printing is performed for the specified region by using the transparent recording material with a second reflectivity obtained when printing is performed for the specified region without using the transparent recording material;
a determination unit configured to determine use of a first display form when the comparison made with the comparison unit indicates that the first reflectivity is higher than the second reflectivity and determine use of a second display form when the comparison made with the comparison unit indicates that the first reflectivity is lower than the second reflectivity; and
a display unit configured to display the specified region by using a display form determined through the determination unit,
wherein the comparison unit compares the first reflectivity with the second reflectivity, the first and second reflectivities being attained in a predetermined pixel of pixels that are included in the specified region, and
wherein when a deviation of differences between the first and second reflectivities that are attained in the pixels has a value larger than a predetermined value, the specified region is divided into at least two regions and the comparison is made again in each of the two regions.

2. The image processing apparatus according to claim 1, wherein the display unit includes a density-determination unit configured to determine a density used to display the specified region based on a difference between the first and second reflectivities that are compared with each other through the comparison unit, and
wherein the specified region is displayed with the determined density by using the display form selected through the determination unit.

3. The image processing apparatus according to claim 1, wherein when a difference between the first and second reflectivities that are compared with each other through the comparison unit has a value smaller than a predetermined value, the display unit displays the specified region by using a third display form.

4. The image processing apparatus according to claim 1, wherein the display unit displays the specified region by using the determined display form, and displays a border part of the display form with a maximum density.

5. The image processing apparatus according to claim 1, wherein the display unit uses the determined display form for the specified region, and changes the specified region into a transparent region and superimposes the transparent region and the image data-for-outputting on each other for display.

6. The image processing apparatus according to claim 1, wherein the display unit performs gray-scale display of a region which is not specified through the specification unit.

7. The image processing apparatus according to claim 1, wherein when a deviation of differences between the first and second reflectivities that are attained in the pixels has a value smaller than a predetermined value, a difference between the first and second reflectivities that are attained in the specified region is determined to be a value obtained by averaging the differences between the first and second reflectivities, the differences being obtained as a result of the comparison.

8. The image processing apparatus according to claim 1, wherein the comparison unit acquires a difference between the first and second reflectivities that are attained in a predetermined pixel of pixels that are included in the specified region,
wherein when the image data-for-outputting is image data and the specified region is included in the image data even though a deviation of differences between the first and second reflectivities that are attained in the pixels has a value larger than a predetermined value, a predetermined value is determined to be a difference between the first and second reflectivities that are attained in the region.

9. The image processing apparatus according to claim 1, wherein the comparison unit generates lookup-table data by a type of a sheet used for printing and outputting the image data-for-outputting, and acquires a reflectivity with reference to the generated lookup-table data.

10. The image processing apparatus according to claim 9, wherein an adhesion amount of a recording material used to print and output data, and an irradiation angle of a light source are also used to generate the lookup-table data.

11. The image processing apparatus according to claim 1, wherein a difference between the first and second reflectivities that are compared with each other through the comparison unit is acquired as a value which is proportional to a difference between asperities of a surface of an output sheet for which the transparent recording material is used and asperities of a surface of an output sheet for which the transparent recording material is not used.

12. The image processing apparatus according to claim 1, wherein the transparent recording material is transparent toner.

13. A method of controlling an image processing apparatus, the method comprising the steps of:
specifying a region where printing is performed by using a transparent recording material in image data-for-outputting;
comparing a first reflectivity obtained when printing is performed for the specified region by using the transparent recording material with a second reflectivity obtained when printing is performed for the specified region without using the transparent recording material;
determining use of a first display form when the comparison made at the comparison step indicates that the first reflectivity is higher than the second reflectivity and determining use of a second display form when the comparison made at the comparison step indicates that the first reflectivity is lower than the second reflectivity; and
displaying the specified region by using a display form determined at the determination step,
wherein, at the comparison step, the first reflectivity is compared with the second reflectivity, the first and second reflectivities being attained in a predetermined pixel of pixels that are included in the specified region, and
wherein when a deviation of differences between the first and second reflectivities that are attained in the pixels has a value larger than a predetermined value, the specified region is divided into at least two regions and the comparison step is performed again in each of the two regions.

14. The method of controlling the image processing apparatus according to claim 13,
wherein the display step includes a density-determination step provided to determine a density used to display the specified region based on a difference between the first and second reflectivities that are compared with each other at the comparison step, and
wherein the specified region is displayed with the determined density by using the display form selected at the determination step.

15. The method of controlling the image processing apparatus according to claim 13,
wherein when a difference between the first and second reflectivities that are compared with each other at the comparison step has a value smaller than a predetermined value, the specified region is displayed by using a third display form at the display step.

16. The method of controlling the image processing apparatus according to claim 13,
wherein the specified region is displayed at the display step by using the determined display form, and a border part of the display form is displayed with a maximum density.

17. The method of controlling the image processing apparatus according to claim 13,
wherein the determined display form is used for the specified region at the display step, the specified region is changed into a transparent region, and the transparent region and the image data-for-outputting are superimposed on each other for display.

18. The method of controlling the image processing apparatus according to claim 13,
wherein gray-scale display of a region which is not specified at the specification step is displayed at the display step.

19. The method of controlling the image processing apparatus according to claim 13,
wherein when a deviation of differences between the first and second reflectivities that are attained in the pixels has a value smaller than a predetermined value, a difference between the first and second reflectivities that are attained in the specified region is determined to be a value obtained by averaging the differences between the first and second reflectivities, the differences being obtained as a result of the comparison.

20. The method of controlling the image processing apparatus according to claim 13,
wherein, at the comparison step, a difference between the first and second reflectivities that are attained in a predetermined pixel of pixels that are included in the specified region is acquired,
wherein when the image data-for-outputting is image data and the specified region is included in the image data even though a deviation of differences between the first and second reflectivities that are attained in the pixels has a value larger than a predetermined value, a predetermined value is determined to be a difference between the first and second reflectivities that are attained in the region.

21. The method of controlling the image processing apparatus according to claim 13, wherein, at the comparison step, lookup-table data is generated by a type of a sheet used for printing and outputting the image data-for-outputting, and a reflectivity is acquired with reference to the generated lookup-table data.

22. The method of controlling the image processing apparatus according to claim 21, wherein an adhesion amount of a recording material used to print and output data, and an irradiation angle of a light source are also used to generate the lookup-table data.

23. The method of controlling the image processing apparatus according to claim 13, wherein a difference between the first and second reflectivities that are compared with each other at the comparison step is acquired as a value which is proportional to a difference between asperities of a surface of an output sheet for which the transparent recording material is used and asperities of a surface of an output sheet for which the transparent recording material is not used.

24. The method of controlling the image processing apparatus according to claim 13, wherein the transparent recording material is transparent toner.

25. A program making a computer execute the method according to claim 13.

* * * * *